May 20, 1924.  1,494,975

H. G. REIST

BEARING

Filed March 1, 1922

Inventor:
Henry G. Reist,
by His Attorney.

Patented May 20, 1924.

1,494,975

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

BEARING.

Application filed March 1, 1922. Serial No. 540,282.

*To all whom it may concern:*

Be it known that I, HENRY G. REIST, a citizen of the United States, residing at Schenectady, in the county of Schenectady, State of New York, have invented certain new and useful Improvements in Bearings, of which the following is a specification.

My invention relates to bearings for machines provided with vertical shafts, and is particularly applicable to machines of large diameter.

The shaft of such a machine carries the rotatable member of the machine, and is supported by a thrust bearing, which is in turn supported by a bearing bracket in the form of a bridge structure mounted on the stationary member of the machine. Heretofore, such bridge structures have been so constructed that the thrust bearings had to be mounted above and on top of the bridge structures, thus requiring a very long shaft and a greater height of station for accommodating the extra tall machine.

In accordance with my invention, the bearing bracket is so constructed and arranged that the thrust bearing for supporting the rotatable part of the machine is located between beams forming the bridge structure and below the upper edge of the beams. By constructing the bearing bracket in this way, the shaft of the machine is considerably shortened, and at the same time, the beams forming the bridge structure may be made deeper and lighter than was heretofore possible.

Figure 1:
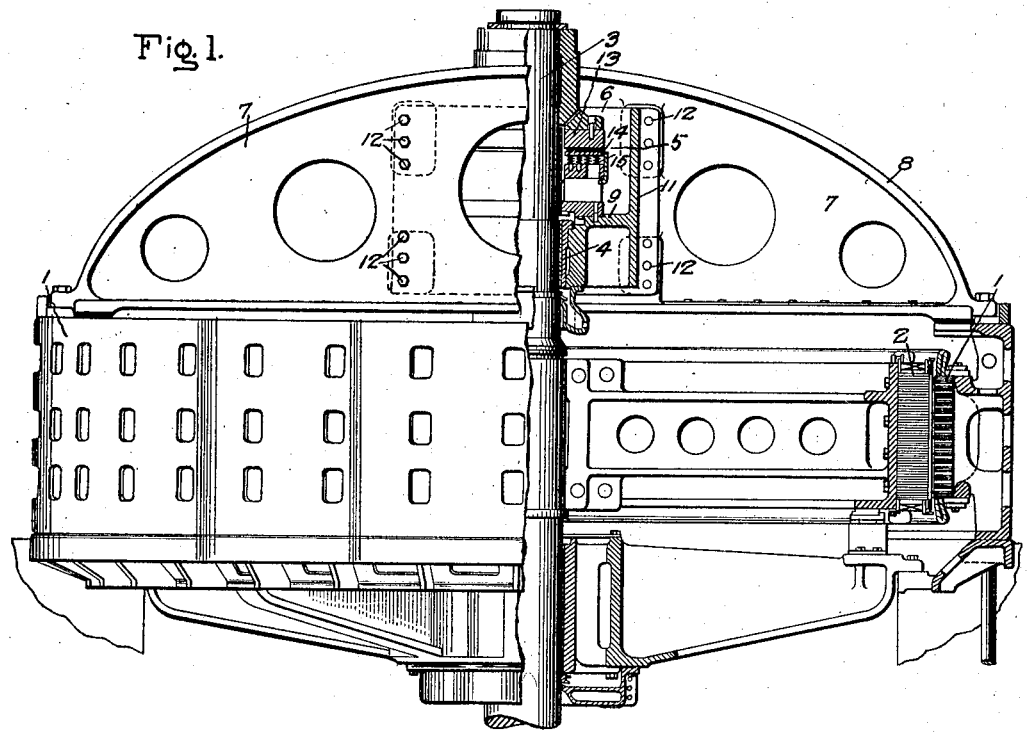
Figure 2:
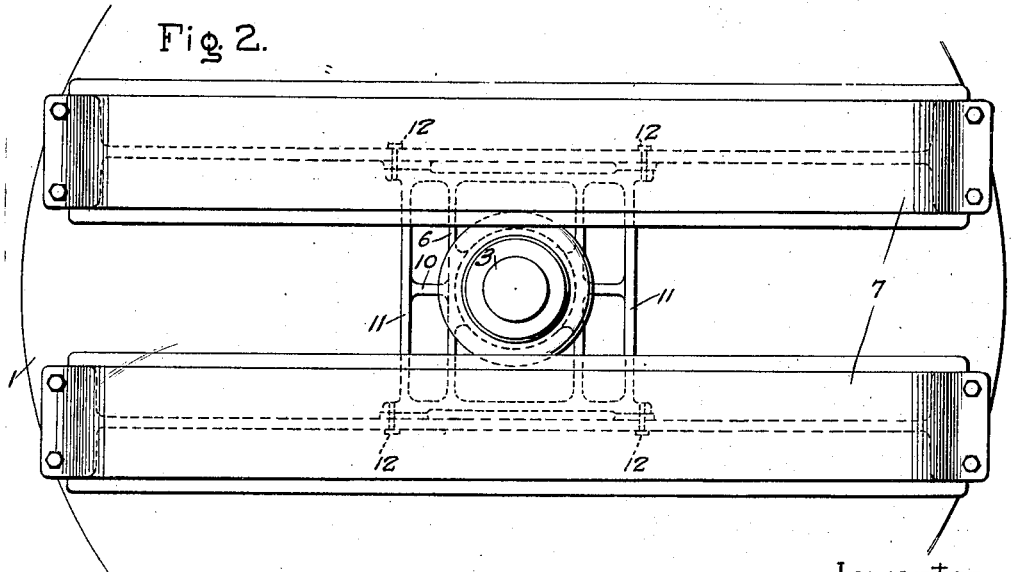

For a better understanding of my invention reference may be had to the following description taken in connection with the accompanying drawing, in which Fig. 1 is a view partly in section of a machine embodying my invention; and Fig. 2 is a top view of the machine of Fig. 1.

In the drawing, I have illustrated my bearing in a dynamo electric machine having a stationary member 1 and a rotatable member 2 mounted on a vertical shaft 3. The dynamo electric machine shown in the drawing is of the alternating current type having a stationary armature and a revolving field and is driven by a motor (not shown) of any well known type, connected to the lower end of the shaft. My invention is not limited to dynamo electric machines, and may be used in any kind or type of machine in which the rotatable member is mounted on a vertical shaft.

The vertical shaft 3 has a sleeve or guide bearing 4 and a thrust bearing 5, both of which may be of any well known type. My new bearing bracket comprises a member 6 on which these bearings are mounted and a plurality of beams 7. The beams 7 are supported on the stationary member 1 of the machine and are spaced apart, as clearly shown in Fig. 2 throughout their length. The member 6 is supported between the beams 7 and between the upper and lower edges thereof, and the bearings 4 and 5 are located between the upper and lower edges of the beams 7.

The member 6 is shown as comprising a deck 9 supported between ribs 10 and somewhat below the middle thereof, the ribs 10 being supported by end plates 11 which are fastened to the beams 7 by means of bolts 12. The deck 9 is located between the upper and lower edges of the beams and has mounted thereon the thrust bearing 5. The guide bearing 4 is mounted on the member 6 below the deck 9.

The particular thrust bearing shown, is that covered by my prior application, Serial No. 159,976, filed April 5, 1917, and forms no part of the present invention. This thrust bearing comprises relatively rotatable plates 13 and 14. The plate 13 is relatively rigid and inflexible and rotates with the shaft 3. The plate 14 is in the form of a thin, flat, flexible ring of metal, and is supported on a large number of helical springs 15 arranged close together so that they may in effect constitute an elastic cushion under the plate 14.

The bearing bracket construction as described above is well adapted to be made of castings, structural steel or reinforced concrete, and makes it practicable to build the beams 7 deeper and consequently lighter than it was possible to build the beams of bearing brackets as heretofore constructed. Furthermore, this construction allows the beams 7 to be placed far enough apart so that there is working room between them for removing the thrust bearing 5. It also permits the use of a much shorter shaft for the machine than was possible heretofore.

What I claim as new and desire to secure by Letters Patent of the United States, is:

1. In a machine having rotatable and stationary members and a vertical shaft on which said rotatable member is mounted, a thrust bearing for said shaft, and a bearing bracket for supporting said thrust bearing comprising a member on which said thrust bearing is mounted, a plurality of separate beams supported on said stationary member of said machine and spaced apart throughout their length, said member on which said thrust bearing is supported being supported from said beams and between the upper and lower edges of said beams, said thrust bearing being located between the upper and lower edges of said beams.

2. In a machine having rotatable and stationary members and a vertical shaft on which said rotatable member is mounted, a thrust bearing and a guide bearing for said shaft, and a bearing bracket for supporting said thrust bearing and said guide bearing comprising a member on which said thrust bearing and said guide bearing are mounted, a plurality of separate beams supported on said stationary member of said machine and spaced apart throughout their length, said member on which said bearings are mounted being supported from said beams and between the upper and lower edges thereof, said bearings being located between the upper and lower edges of said beams.

3. In a machine having rotatable and stationary members and a vertical shaft on which said rotatable member is mounted, a thrust bearing for said shaft, and a bearing bracket for supporting said thrust bearing comprising a member having a deck, said thrust bearing being mounted on said deck, a plurality of beams supported on said stationary member of said machine and spaced apart throughout their length, said member being supported from and between said beams so that said deck is located between the upper and lower edges of said beams, said thrust bearing being located between the upper and lower edges of said beams.

4. In a machine having rotatable and stationary members and a vertical shaft on which the rotatable member is mounted, a thrust bearing and a guide bearing for said shaft, and a bearing bracket for supporting said thrust bearing and said guide bearing comprising a member having a deck, said thrust bearing being mounted on said deck, said guide bearing being mounted on said member below said deck, a plurality of beams supported on said stationary member of said machine and spaced apart throughout their length, said member being supported from and between said beams so that said deck is located between the upper and lower edges of said beams, said bearings being located between the upper and lower edges of said beams.

In witness whereof, I have hereunto set my hand this 28th day of February, 1922.

HENRY G. REIST.